Figure 1:
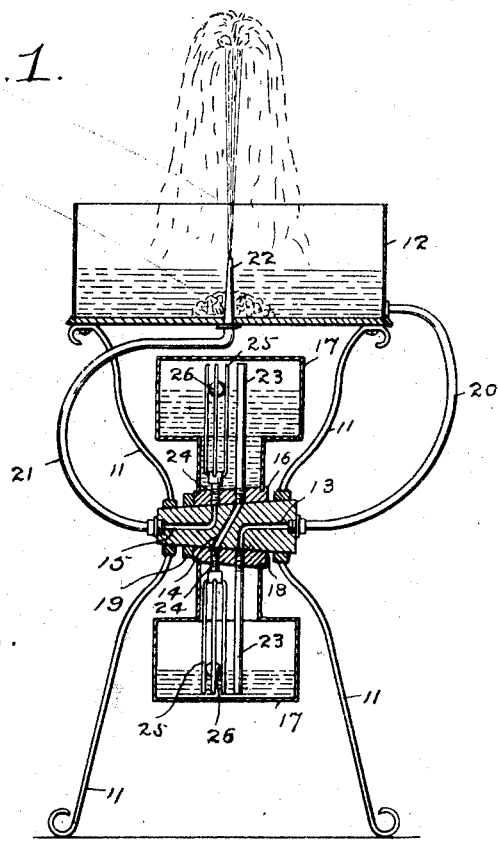

No. 883,038. PATENTED MAR. 24, 1908.
N. P. METROFANOFF.
MECHANICAL FOUNTAIN.
APPLICATION FILED JULY 29, 1907.

WITNESSES
H. A. Lamb
S. W. Atherton

INVENTOR
Nicholas P. Metrofanoff
BY
N. Wooster
ATTORNEY

UNITED STATES PATENT OFFICE.

NICHOLAS P. METROFANOFF, OF BRIDGEPORT, CONNECTICUT.

MECHANICAL FOUNTAIN.

No. 883,038.   Specification of Letters Patent.   Patented March 24, 1908.

Application filed July 29, 1907. Serial No. 386,008.

*To all whom it may concern:*

Be it known that I, NICHOLAS P. METROFANOFF, a subject of the Czar of Russia, residing at Bridgeport, county of Fairfield, State of Connecticut, have invented a new and useful Mechanical Fountain, of which the following is a specification.

This invention has for its object to provide a mechanical fountain comprising two reservoirs placed opposite to each other and carried by a rotating hub, a tank and connections whereby I am enabled to produce a jet or fountain by placing the full reservoir uppermost, and starting the flow again, with but an instant's stoppage, by reversing the reservoirs as soon as the upper reservoir is exhausted.

Figure 3:
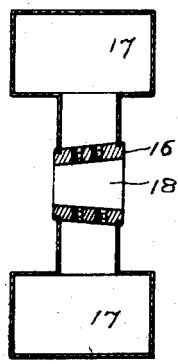
Figure 2:
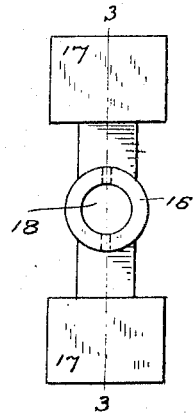
Figure 4:
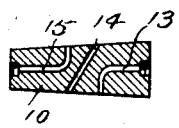

In order to produce a simple and inexpensive device of this character suitable for use in connection with aquariums and wherever a jet of water may be required, I have devised the novel mechanical fountain of which the following description in connection with the accompanying drawing is a specification, reference characters being used to indicate the several parts:

Figure 1 is a vertical sectional view illustrating the construction and operation of my novel fountain; Fig. 2 an end view of the hub and reservoir detached; Fig. 3 a section of the hub and reservoirs on the line 3—3 in Fig. 2; and Fig. 4 is a longitudinal section of the body detached.

10 denotes the body which is round and is preferably made tapering, as shown. The body is rigidly secured to standards 11 which may be of any required shape or design and which also support a tank 12 at a distance above the body. The body is provided with three ducts or passages indicated by 13, 14 and 15.

16 denotes the hub and 17 reservoirs placed on opposite sides of the hub and rigidly secured thereto. The hub is provided with a central opening 18 which receives the body with a ground fit so as to prevent leakage; the body and opening 18 being preferably correspondingly tapered, as shown, although this construction is not essential. I have shown the hub as retained in position on the body by a tightly fitting collar 19.

20 denotes a pipe leading from the tank downward to the body, and 21 a pipe leading from the body upward to the tank and provided with a nozzle 22 which extends upward in the tank slightly above the normal water level. Each reservoir is provided with an induction pipe 23 and an eduction pipe 24. The lower reservoir in Fig. 1 is in the receiving position and the upper reservoir is in the discharging position. The induction and eduction pipes are firmly seated in the hub and extend through to the central opening and are adapted to register with the ducts in the body. The induction pipes extend from the central opening in the hub nearly to the bottoms of the reservoirs (when in the receiving position) and the eduction pipes extend from near the tops of the reservoirs to the central opening in the hub. The mouths of the eduction pipes are provided with guards 25 which retain float valves 26 in place so that they will rise and fall with the water in the reservoirs, and when the water has all passed out of a reservoir will close the eduction pipe and prevent the passage of air therefrom. Pipe 20 communicates with duct 13 in the body and pipe 21 communicates with duct 15 in the body. Duct 14 extends through the body at such an angle as to register with the induction pipe of a discharging reservoir and the eduction pipe of a receiving reservoir, said duct serving as an air passage only.

The operation will be readily understood from Fig. 1. In the position shown, water is passing from the upper reservoir through an eduction pipe 24, duct 15 in the body and pipe 21 to nozzle 22 from which it passes in the form of a spray. As fast as water is delivered in the tank, it passes therefrom by means of pipe 20, duct 13 in the body and an induction pipe 23 to the lower reservoir. As the upper reservoir is exhausted by the passage of water to the tank, the lower reservoir is correspondingly filled by water received from the tank. The lower reservoir becomes filled practically simultaneously with the emptying of the upper reservoir. As the water rises in the lower reservoir, air will be forced therefrom into the upper reservoir through duct 14, and the air in the upper reservoir will force water therefrom through the upper eduction pipe, duct 15, pipe 21 and the nozzle. During the filling of the lower reservoir, the float valve therein will rise in the guard until it engages the mouth of the eduction pipe. The seating of the lower float valve will prevent the passage of water from the lower reservoir to the upper reservoir, and the engagement of the upper float valve with the mouth of the upper eduction pipe when the water in the upper reservoir is exhausted will prevent the passage of any air from the upper reservoir through duct 15 and pipe 21, thus retaining the air pressure in the reservoirs. The operation of my novel fountain may be compared to the operation of an hour-glass. When the water has all passed from the upper reservoir a corresponding amount will have passed into the lower reservoir and the fountain will be started into operation again by reversing the reservoirs, that is by giving the hub a half turn and placing the filled lower reservoir in the place previously occupied by the exhausted upper reservoir, care being taken of course to make the inner ends of the induction and eduction pipes in the hub register with ducts 13 and 15 in the body. Owing to the closeness of the fit of the hub on the body, the reservoirs will be self-retaining in operative position but suitable setting and retaining devices may be provided if preferred. These have not been shown, however, as specifically they form no portion of the present invention.

Having thus described my invention I claim:

1. A mechanical fountain comprising two oppositely placed reservoirs, a hub by which said reservoirs are carried, a body on which said hub is mounted to rotate and which is provided with ducts, a tank above the reservoir, induction and eduction pipes in the reservoirs which are adapted to register with ducts in the body, pipes leading from the tank to the body and from the body to the tank, and means for preventing the passage of water from the lower reservoir to the upper reservoir.

2. In a device of the character described, the combination with a tank, two oppositely placed reservoirs each provided with an induction and an eduction pipe and a hub by which the reservoirs are carried, of a body having ducts adapted to register with the induction and eduction pipes, and pipes communicating with ducts in the body and leading out of and into the tank, means being provided whereby water can not pass into the upper reservoir nor air escape therefrom.

3. In a device of the character described, the combination with a body having ducts, a tank and a hub mounted to rotate on the body, of oppositely placed reservoirs carried by the hub, induction and eduction pipes in the reservoirs adapted to register with the ducts, a guard extending from the mouth of each eduction pipe, float valves in said guards, and pipes communicating with ducts in the body and leading into and out of the tank, the float valve in the lower reservoir preventing the passage of water therefrom to the upper reservoir, and the float valve in the upper reservoir preventing the escape of air therefrom.

In testimony whereof I affix my signature, in presence of two witnesses.

NICHOLAS P. METROFANOFF.

Witnesses:
PAUL ZAICHENKO,
V. V. ALEXANDROF.